George Little.

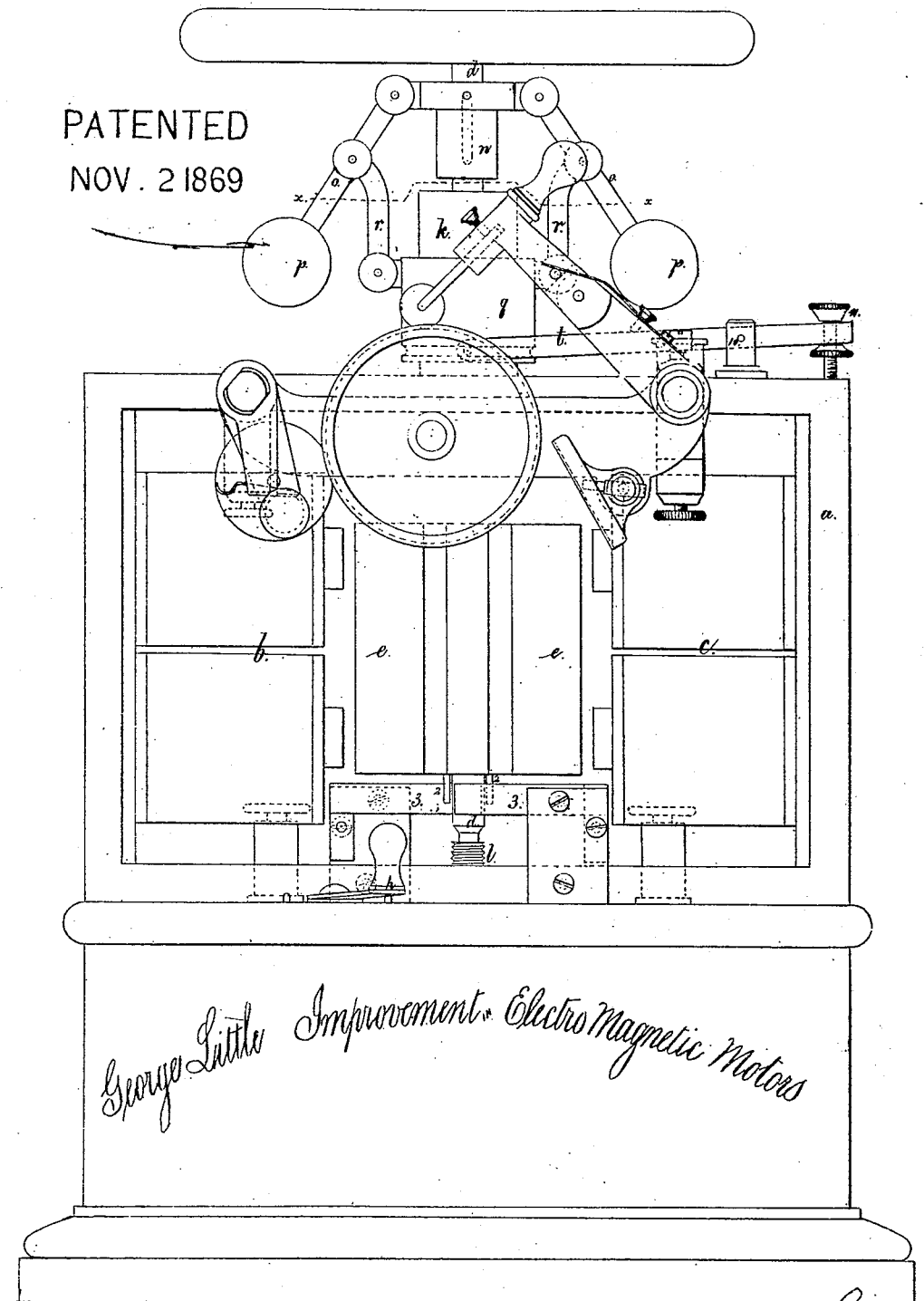

Improvement in Electro Magnetic Motors.

PATENTED
NOV 2 1869

Witnesses: Geo. D. Walker
Geo. T. Pinckney

George Little

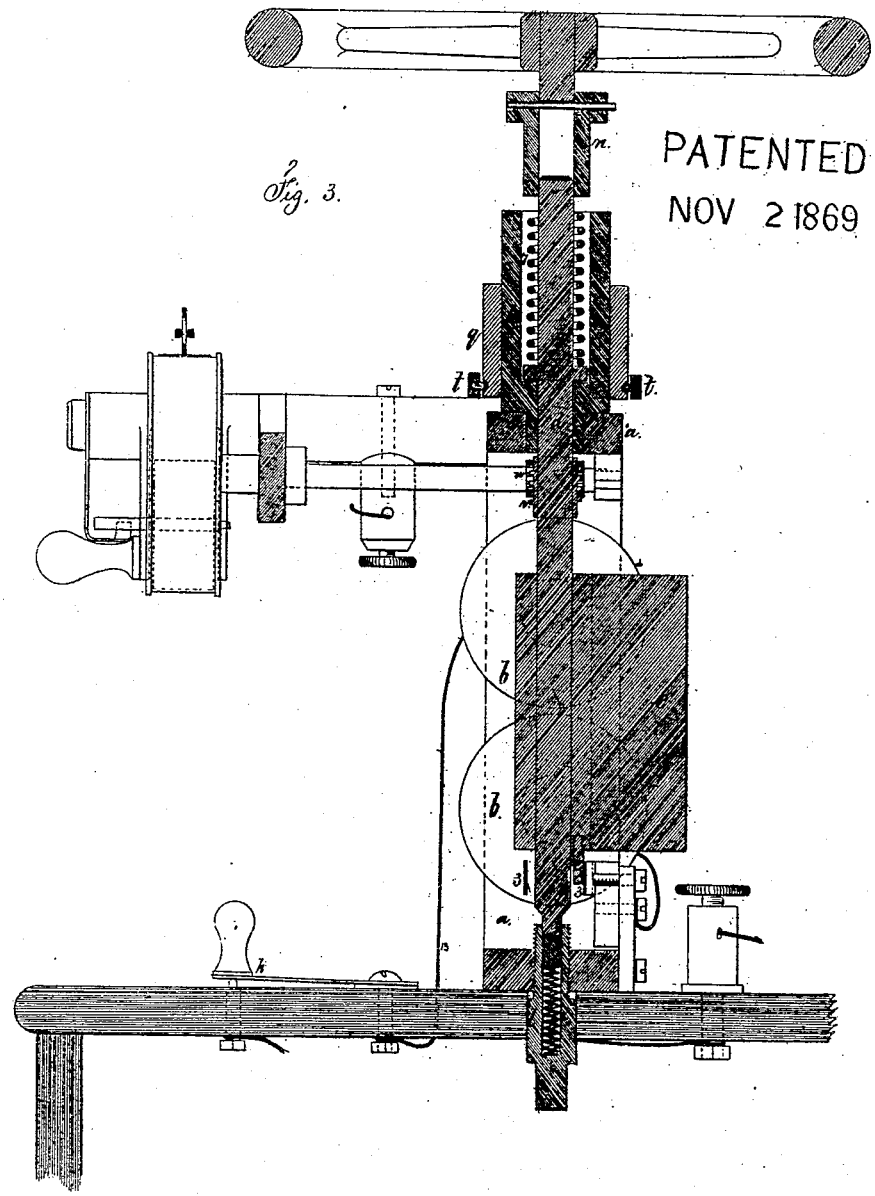

UNITED STATES PATENT OFFICE.

GEORGE LITTLE, OF RUTHERFORD PARK, NEW JERSEY.

IMPROVEMENT IN ELECTRO-MAGNETIC MOTORS.

Specification forming part of Letters Patent No. 96,332, dated November 2, 1869.

*To all whom it may concern:*

Be it known that I, GEORGE LITTLE, of Rutherford Park, in the county of Bergen and State of New Jersey, have invented and made a new and useful Improvement in Electro-Magnetic Motors; and I do hereby declare the following to be a full, clear, and exact description of the said invention, reference being had to the annexed drawing, making part of this specification, wherein—

Figure 4:
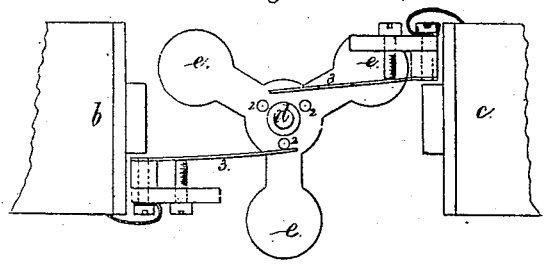
Figure 2:
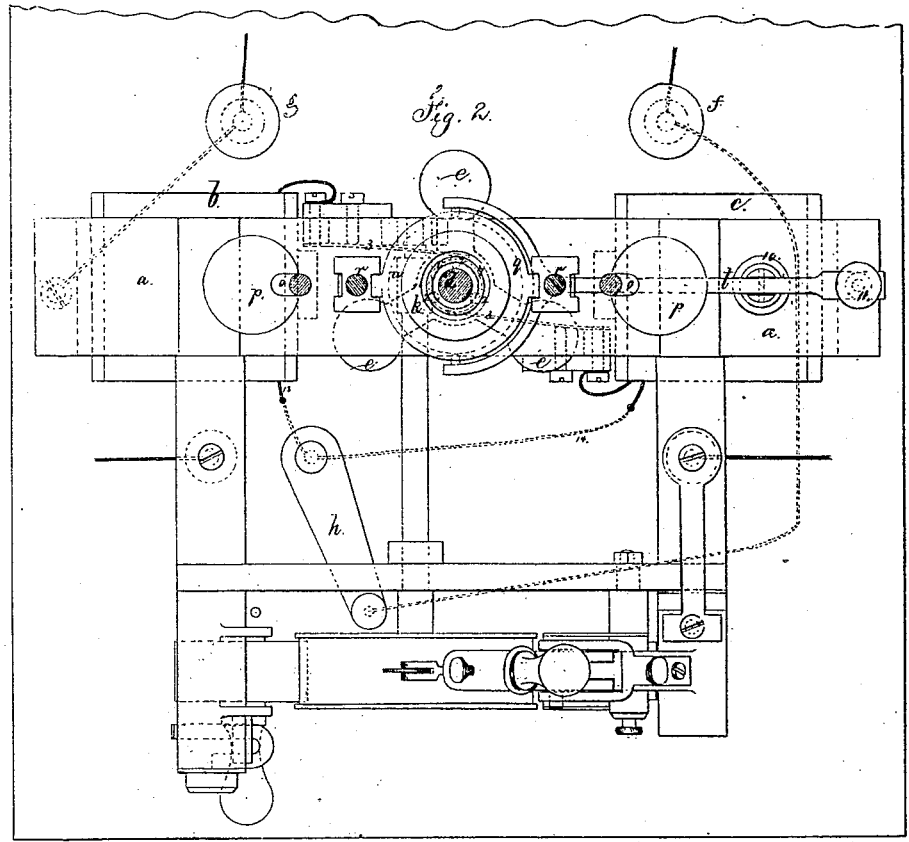

Figure 1 is an elevation of the said motor. Fig. 2 is a plan of the same below the line $x\,x$, Fig. 1. Fig. 3 is a vertical section of the spindle of the motor and the parts connected therewith; and Fig. 4 is an inverted plan of the armature, circuit-closers, and magnets.

Similar marks of reference denote the same parts.

The object of this invention is to produce a motor to be driven by electro-magnetism, that can be made to operate a telegraph-instrument or similar device in which but little power is required and a uniform or nearly uniform speed is desirable.

I have illustrated my invention in connection with the roller of an instrument for transmitting pulsations of electricity through the perforations in a strip of paper; but this motor may be applied to other uses.

The nature of my present invention consists in a revolving armature mounted upon a spindle, to which an end movement can be given by the action of a governor, so as to increase a friction upon said spindle when the speed becomes too great, and to lessen that friction when the speed is slowed, thereby regulating the speed of the motor by the friction applied to the same from a governor.

In the drawing, $a$ represents a frame, carrying the magnets $b$ and $c$, and also sustaining the spindle $d$, upon which are the armatures $e$.

I have shown said armatures in the form of a three-sided head, and I remark that, with two magnets, (which number I prefer,) there should be three armatures, as shown; but the number might be varied.

I arrange the circuit-closers in such a manner that the circuit is closed to one magnet as one of the armatures is approaching that magnet, and then the circuit is closed to the next magnet, in order that there may be a rotation of the armatures resulting from the attraction of the magnets acting in one direction, and said attraction ceases as the armature arrives at its nearest point to the magnet, the circuit being broken at that point. I make use of pins 2 2 2, projecting from the respective armatures, and closing the circuit when in contact with one of the springs 3, leading to the respective magnets.

The battery-wires are led to the binding-screws $f\,g$. From the screw $f$ the wire passes to the switch $h$, and when that is closed the current goes, by the wire 13 or 14, to the magnet $b$ or $c$; thence, by one of the insulated circuit-closing springs 3 3, to the armature-spindle and frame $a$; thence to the binding-screw $g$.

Having thus described the means for giving rotation to the armatures and spindle, I now proceed to state the manner of applying friction to regulate the speed.

The spindle $d$ is provided with a collar or disk, 5, within the cylinder $k$, and the step $l$ for said spindle is made adjustable, and contains a balancing-spring, 6. This step is screwed up until the spring 6 sustains the spindle and parts carried thereby, and the disk or collar 5 is relieved from friction at the bottom of the cylinder $k$. Around the spindle $d$ is a spring, 7, above the collar 5, and also a sleeve, $n$, fitted on a feather, or with a key in a slot in $d$, and this sleeve $n$ carries the joints of the arms $o\,o$ for the governor-balls $p$. $q$ is a sleeve around the cylinder $k$, to which the lower ends of the links $r$ of the governor are connected, and this sleeve $q$ revolves freely with the governor around the cylinder $k$; and said sleeve $q$ is fitted with a groove, taking the forked end of the lever $t$, and this lever $t$ is on a fulcrum, 10, and the forked end can be raised or lowered by the screw 11.

It will now be understood that, when the sleeve $q$ remains at its lowest point, the rotation of the motor throws out the governor-balls at a comparatively slow speed, sufficiently to cause the sleeve $n$ to descend upon the spring 7, and thereby the collar 5 will be pressed against the lower end of the cylinder $k$, and the friction thereof increased in proportion to the speed and consequent pressure from the governor-balls. This tends to check the speed and secure uniformity of rotation.

The adjustment to any required degree of speed is effected by raising or lowering the sleeve $q$ by the lever $t$, for when the said sleeve $q$ is raised the governor-balls will have to revolve more rapidly before the centrifugal force will be sufficient to throw them out and cause the sleeve $n$ to press upon the spring 7 and collar 5.

I have shown a worm-pinion, $v$, on the spindle $d$, driving a wheel, $w$, of a transmitting-roller; but this portion of my apparatus does not require further description, it being the subject of a separate application for a patent.

By this construction of motor an instrument for telegraphic or other purposes can be driven with the required speed, and two or more instruments in one line can be made to revolve with uniformity.

What I claim, and desire to secure by Letters Patent, is—

1. An electro-magnetic motor, formed with armatures upon a spindle, in combination with stationary magnets and governor-balls, applied in substantially the manner specified, to communicate an end movement to the spindle and regulate the speed by the friction resulting from such end movement, substantially as set forth.

2. The cylinder $k$, collar 5, sleeves $n$ and $q$, and governor-balls $p$, arranged and applied substantially as set forth, in combination with the spindle $d$, armatures $e$, and electro-magnets $b$ $c$, substantially as set forth.

3. The adjustable step $l$ and spring 6, in combination with the spindle $d$, carrying the armatures $e$ and friction-collar 5, so that the spindle $d$ and its parts are sustained or balanced by the said spring 6, for the purposes and as set forth.

In witness whereof I have hereunto set my signature this 28th day of July, A. D. 1869.

GEORGE LITTLE.

Witnesses:
GEO. D. WALKER,
GEO. T. PINCKNEY.